United States Patent
Tene et al.

(10) Patent No.: US 8,839,274 B2
(45) Date of Patent: Sep. 16, 2014

(54) ACCELERATED CLASS CHECK

(75) Inventors: Gil Tene, Los Altos Hills, CA (US); Cliff N. Click, Jr., San Jose, CA (US); Murali Sundaresan, Sunnyvale, CA (US); Michael A. Wolf, San Francisco, CA (US)

(73) Assignee: Azul Systems, Inc., Sunnyvale, CA (US)

( * ) Notice: Subject to any disclaimer, the term of this patent is extended or adjusted under 35 U.S.C. 154(b) by 75 days.

(21) Appl. No.: 13/227,111

(22) Filed: Sep. 7, 2011

(65) Prior Publication Data

US 2011/0321064 A1  Dec. 29, 2011

Related U.S. Application Data

(63) Continuation of application No. 11/296,652, filed on Dec. 6, 2005, now Pat. No. 8,037,482, which is a continuation-in-part of application No. 11/227,419, filed on Sep. 14, 2005, now Pat. No. 7,987,473.

(60) Provisional application No. 60/610,028, filed on Sep. 14, 2004.

(51) Int. Cl.
  *G06F 9/54* (2006.01)
  *G06F 9/30* (2006.01)
  *G06F 9/44* (2006.01)

(52) U.S. Cl.
  CPC .............. *G06F 9/3016* (2013.01); *G06F 9/443* (2013.01); *G06F 9/30167* (2013.01)
  USPC ........... 719/321; 719/320; 719/323; 717/116; 717/148; 717/158

(58) Field of Classification Search
  CPC .... G06F 9/443; G06F 9/3016; G06F 9/30167
  See application file for complete search history.

(56) References Cited

U.S. PATENT DOCUMENTS

| | | | | |
|---|---|---|---|---|
| 5,615,400 | A | * | 3/1997 | Cowsar et al. ................ 719/332 |
| 6,161,217 | A | * | 12/2000 | Detlefs et al. ................ 717/141 |
| 6,598,141 | B1 | * | 7/2003 | Dussud et al. ................ 711/170 |
| 6,785,687 | B2 | | 8/2004 | Baskins et al. |
| 6,948,156 | B2 | | 9/2005 | Sokolov |

(Continued)

OTHER PUBLICATIONS

Fing Qian, Toward dynamic interprocedural analysis in JVMs, Feb. 16, 2004.*

(Continued)

*Primary Examiner* — H S Sough
*Assistant Examiner* — Syed Roni
(74) *Attorney, Agent, or Firm* — Van Pelt, Yi & James LLP

(57) ABSTRACT

Handling a virtual method call includes extracting, from a pointer to an object, an identifier associated with the class of the object, the pointer to the object being associated with the virtual method call, and the identifier being embedded within the pointer; using the identifier to obtain a virtual method table, including locating a first entry in a class identifier table mapping a plurality of class identifiers to a corresponding plurality of class data, the first entry being associated with the identifier and comprising the virtual method table or a pointer used to obtain the virtual method table; locating a second entry in the virtual method table, the second entry being associated with the virtual method call; and jumping to an address associated with the second entry to execute code at the address.

17 Claims, 6 Drawing Sheets

(56) References Cited

U.S. PATENT DOCUMENTS

| | | | |
|---|---|---|---|
| 7,069,540 B1* | 6/2006 | Sievert | 717/120 |
| 2002/0194191 A1* | 12/2002 | Sexton et al. | 707/102 |
| 2003/0177152 A1* | 9/2003 | Darnell | 707/206 |
| 2004/0205701 A1* | 10/2004 | Onodera | 717/108 |
| 2005/0155044 A1 | 7/2005 | Broussard et al. | |
| 2005/0198045 A1 | 9/2005 | Wu et al. | |

OTHER PUBLICATIONS

White Paper, The Java HotSpot Virtual Machine, Sep. 2002.*

* cited by examiner

CID Table

| CID | Class Address |
|-----|---------------|
| ⋮   | ⋮             |
| ⋮   | ⋮             |

ACCELERATED CLASS CHECK

CROSS REFERENCE TO OTHER APPLICATIONS

This application is a continuation of U.S. patent application Ser. No. 11/296,652, entitled ACCELERATED CLASS CHECK filed Dec. 6, 2005, now U.S. Pat. No. 8,037,482, which is incorporated herein by reference in its entirety for all purposes, which is a continuation in part of U.S. patent application Ser. No. 11/227,419 entitled ACCELERATED CLASS CHECK filed Sep. 14, 2005, now U.S. Pat. No. 7,987,473, which is incorporated herein by reference in its entirety for all purposes, which claims priority to U.S. Provisional Patent Application No. 60/610,028 entitled VIRTUAL MACHINE filed Sep. 14, 2004, which is incorporated herein by reference in its entirety for all purposes.

BACKGROUND OF THE INVENTION

In object oriented programming languages, determining information about a class of an object from an object pointer can consume a large amount of performance resources. FIG. 1 is a block diagram illustrating a relationship between an object pointer, an object, and a class structure. Object pointer 102 includes a virtual memory address of object 104. Object 104 contains information associated with the object and includes a pointer to class structure 106 associated with the class of object 104. For each class in a program, there exists only one class structure. Objects belonging to the same class contain the same pointer to the same class structure. Class structure 106 includes information associated with an object class. Given a pointer of an object, it is often desired to determine if the class of the object associated with the pointer belongs to a known class. Since class structure pointers refer to the only class structure of a class, the value of a class structure pointer can be used as an identifier to compare object classes. An object is stored in memory using the given object pointer, and the class structure pointer is obtained from the object. The obtained class structure pointer is compared with a known class structure pointer value to determine if the class of the object associated with the given object pointer is same as the class associated with the known class object pointer value. This comparison process can consume a large amount of performance resources. Loading the object using the given object pointer usually produces a cold cache miss, causing misses in every cache level. A large number of clocks cycles are wasted as the object is brought into the cache from main memory. Since class comparisons are very common operations in object oriented language programs, it is desirable to speed up class comparison operations. Therefore, there exists a need for a more efficient way to obtain data associated with a class of an object.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
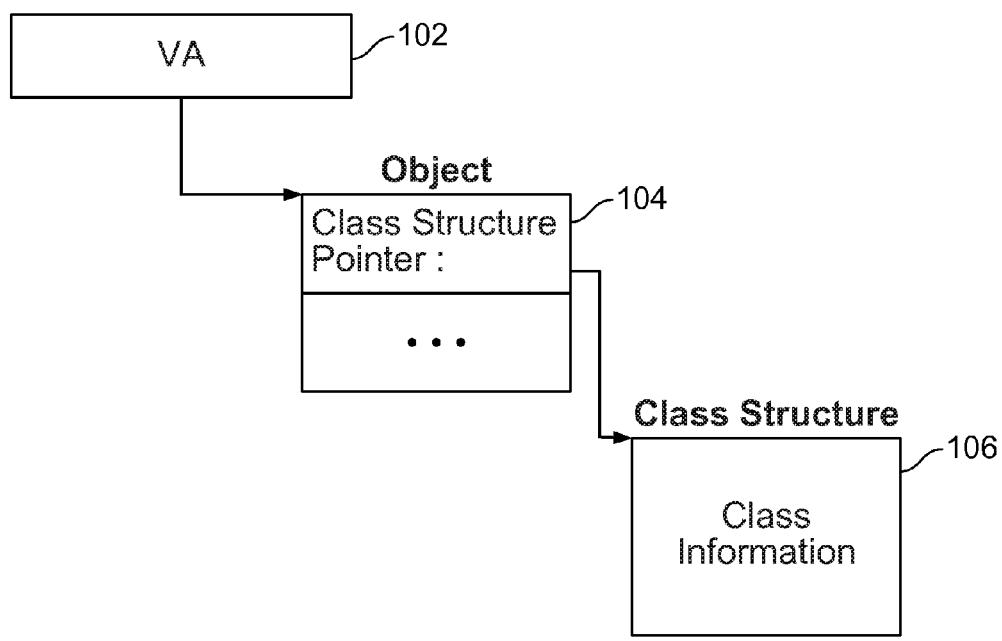
FIG. 1 is a block diagram illustrating a relationship between an object pointer, an object, and a class structure.
Figures 2, 3:
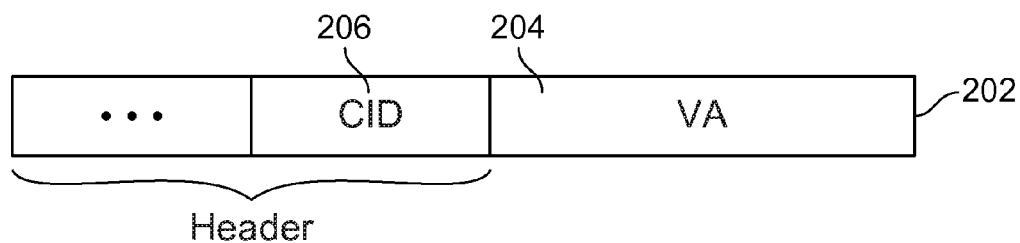
FIG. 2 is a diagram illustrating an embodiment of an object pointer.
FIG. 3 is a diagram illustrating an embodiment of a table including one or more class identifiers.

FIG. 2 is a diagram illustrating an embodiment of an object pointer. Box 202 represents an object pointer. The object pointer may include any number of bits. Often the number of bits of an object pointer is larger than the number of bits required to represent the total amount of memory addressable on a system. For example a 64 bit object pointer can address 16 billion gigabytes of data. At least some bits of the object pointer can be used as header bits (bits not implemented as address bits). Object pointer 202 includes virtual address bits 204 that refer to an object associated with virtual address 204. The numbers of bits used to contain the virtual address may be preconfigured or dynamically configured. In some embodiments, the numbers of bits used to contain the virtual address is associated with the maximum amount of memory that can physically exist on a system. At least a portion of the header of object pointer 202 includes class identifier (CID) bits 206. The header may include other data. Class identifier 206 is associated with at least one class structure pointer. The number of bits comprising class identifier 206 may be preconfigured or configured dynamically. In some embodiments, the number of bits comprising class identifier 206 is less than the number of bits comprising a call information object pointer. In some embodiments, the number of classes in a program is less than or equal to the number of classes representable by the number of bits used to contain class identifier 206. Each class in the program may be associated with a unique class identifier. In some embodiments, a class identifier is associated with more than one class in a program. For example if the number of classes in a program is greater than the number of classes representable by the number of bits used to contain class identifier 206, a single class identifier may be associated with more than one class. To identify these classes associated with the single class identifier, the object associated with virtual address 204 may be loaded to obtain the class structure pointer.

FIG. 3 is a diagram illustrating an embodiment of a table including one or more class identifiers. The table may contain data associated with the class identifier. Data contained the table may be located using a class identifier. The class identifiers may be CID 206 of FIG. 2. The table may include table entries each associated with a different possible valid CID value, where all valid CID values are associated in the table. For example, each valid CID value associated with a class in a program may be stored as an entry in the table. The one or more class identifiers in a table entry may be associated with a class structure pointer in the table entry. For example, a table entry includes a CID and a class structure pointer both associated with the same class. In some embodiments if a CID is associated with more than one class, the CID is associated with a table entry indicating more than one class is associated with the CID. By storing and associating a CID with a class structure pointer, the class structure pointer may be accessed by using the CID to obtain the class structure pointer from the table rather than loading an object using a virtual address to obtain the class structure pointer. The aggregation of CIDs and associated class data in a table can improve data locality in programs where the associated class data is accessed frequently. In some embodiments, at least a portion of information in a class structure is stored in a table entry associated with a class identifier. In some embodiments, a virtual method table and a class identifier, both associated with the same class, are included together in a table entry. In some embodiments, a pointer to a virtual method table and a class identifier, both associated with the same class, are included together in a table entry. The virtual method table may be used to invoke methods associated with the class. For example, a desired class method may be invoked by using a CID in the object pointer to locate an entry in the class identifier table containing a class method table associated with the class of the object pointer and invoking the desired method in the method table. In some embodiments, the virtual method table includes a start address of each method defined in a class or inherited from a superclass.

Figure 4:
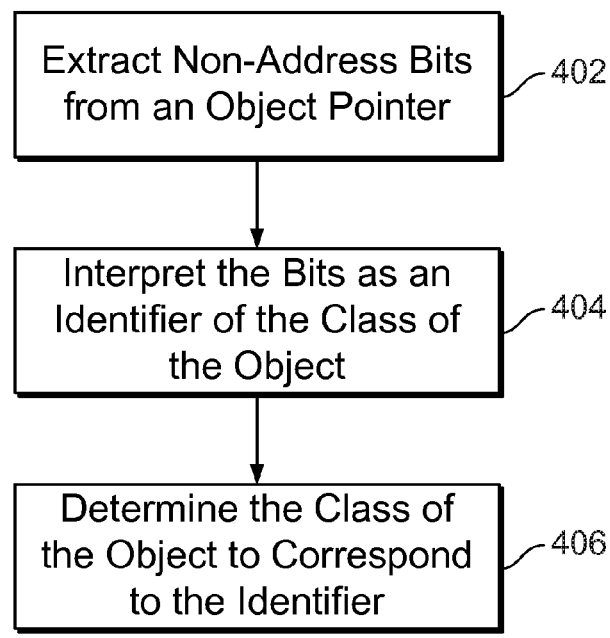
FIG. 4 is a flow chart illustrating an embodiment of a process for determining a class of an object.

FIG. 4 is a flow chart illustrating an embodiment of a process for determining a class of an object. At 402, one or more non-address bits are extracted from an object pointer. Non-address bits may be CID 206 of FIG. 2. The object pointer may be object pointer 202 of FIG. 2. Extracting the bits may include obtaining a subset of bits from the object pointer. For example, a mask, a bit wise operation, or a shifting operation is used to obtain one or more header bits of the object pointer. At 404, the extracted bits are interpreted as an identifier of the class of the object associated with the object pointer. Interpreting the extracted bits as an identifier of the class of the object may include performing processing required to use the bits as an identifier associated with the object pointer. The processing may include loading the extracted bits into an immediate field of a processor instruction or loading the bits into a register. At 406, the class of the object associated with the object pointer is determined to correspond to the extracted identifier. In some embodiments, determining the class of the object to correspond to the identifier includes validating the extracted bits as a valid identifier. In other embodiments, determining the class of the object to correspond to the identifier includes comparing the extracted bits with a known value. The known value may be a class identifier value associated with a desired class to be used in the comparison.

Figure 5:
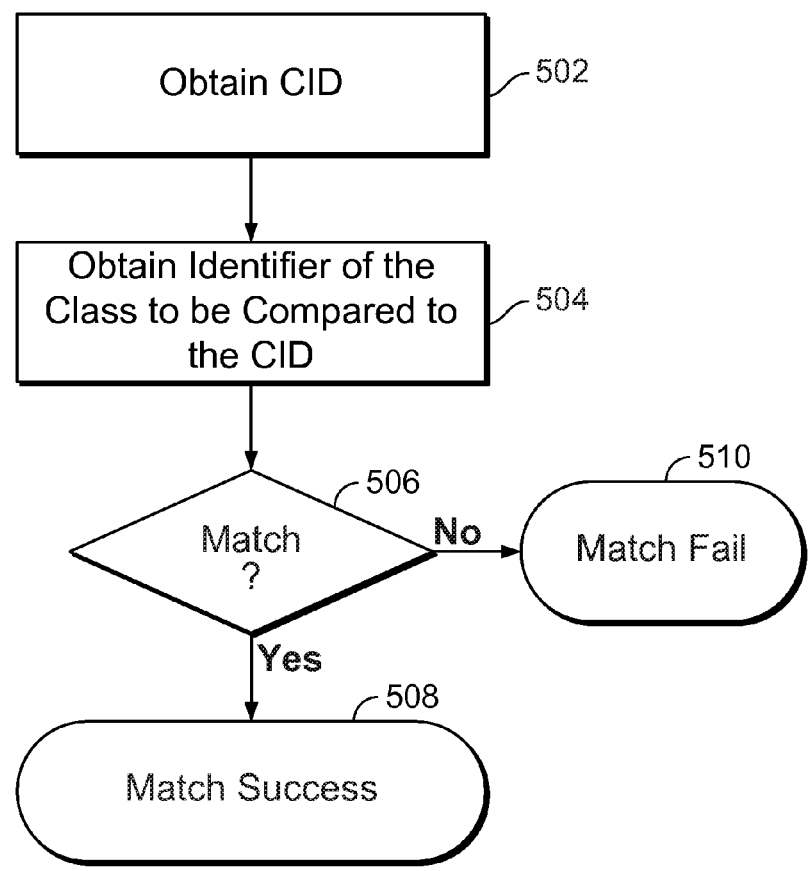
FIG. 5 is a flow chart illustrating an embodiment of a process for performing a comparison associated with a class identifier of an object pointer.

FIG. 5 is a flow chart illustrating an embodiment of a process for performing a comparison associated with a class identifier of an object pointer. In some embodiments, the process of FIG. 5 is included in 406 of FIG. 4. At 502, a CID of the object pointer is obtained. Obtaining the CID may include reading and/or loading the CID value to/from a register or an immediate field of an instruction. In some embodiments, obtaining the CID includes extracting CID bits from the object pointer. At 504, a comparison identifier of the class to be compared to the CID is obtained. The comparison identifier may be a preconfigured or dynamically determined class identifier value. In some embodiments the comparison identifier is a class identifier value of the currently executing program object. Obtaining the comparison identifier may include reading and/or loading the identifier value to/from a register or an immediate field of an instruction. At 506, the obtained CID value and the obtained comparison identifier are compared. If at 506 it is determined the values match, match success is reached at 508. A successful match may indicate an object associated with the obtained CID belongs to the same class as the class associated with the comparison identifier. If at 506 it is determined that the values do not match, match fail is reached at 510. In some embodiments, match fail results in a comparison of the obtained CID with another comparison identifier or the class structure pointer (associated with the object pointer of the obtained CID) is obtained to determine a class associated with the object pointer. In some embodiments, the match fail is associated with a hardware trap. The hardware trap may be associated with a software fixup.

Some object oriented programming languages support virtual method calls. For a same method call site, different code can be executed depending upon the class of the object associated with the virtual call. The target method of virtual calls can only be determined at run-time based at least in part on the class of the object associated with the call. Traditionally, performing the virtual call requires sequence of loads followed by an indirect register jump (indirect jumps often take longer to perform compared to direct jump used in static method calls) to a section of code associated with the virtual call. For example, handling a virtual call includes, loading the class structure from the object, locating the virtual method table from the class structure, loading an address associated with the matching virtual method table entry of the virtual call, and jumping to the loaded address. Each load can potentially cause cache misses in all levels of the cache and evict other useful data from the cache. The performance penalty of the loads and the indirect jump can add up significantly if the virtual calls are invoked often.

Figure 6:
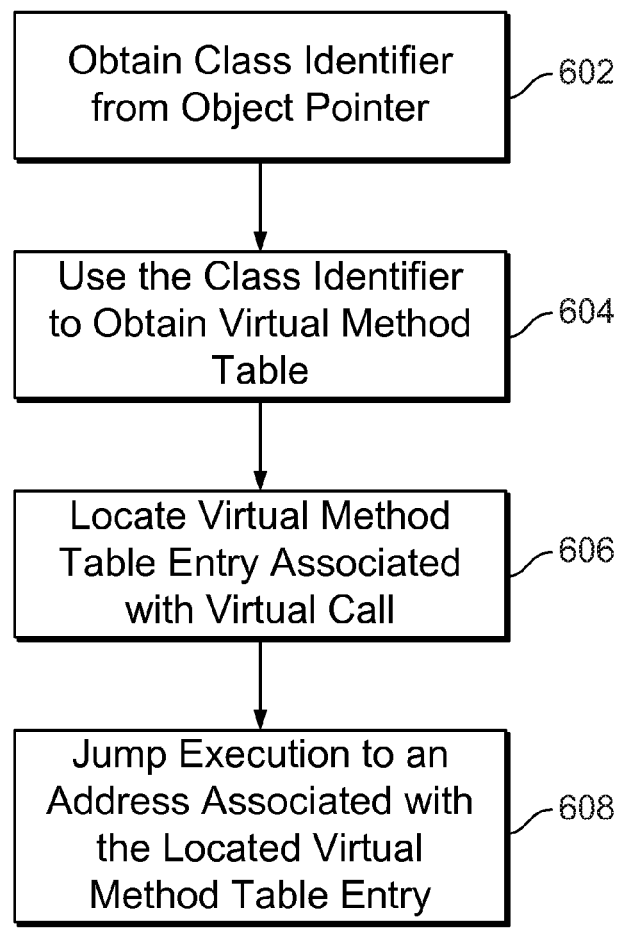
FIG. 6 is a flow chart illustrating an embodiment of a process for handling a virtual method call.

FIG. 6 is a flow chart illustrating an embodiment of a process for handling a virtual method call. At 602, a class identifier is obtained from an object pointer associated with the virtual method call. Obtaining the class identifier may include reading and/or loading the CID value to/from a register or an immediate field of an instruction. In some embodiments, obtaining the class identifier includes extracting CID bits from the object pointer. At 604, the obtained class identifier is used to obtain a virtual method table. The virtual method table may be obtained by locating an entry in a class identifier table associated with the obtained class identifier. The entry may include the desired virtual method table or a pointer to the virtual method table. In some embodiments, the entry includes an object information pointer that is used to obtain the virtual method table. At 606, a table entry in the virtual method associated with the virtual call is located. Locating the entry may include searching the table to find an address associated with a code section of the desired method call. At 608, execution is jumped to an address associated with the located virtual method table entry. The address may be a program address and/or a memory address. Jumping execution may include loading an address value into a register and performing a register jump operation. By using a class identifier (e.g. CID) stored in the header of an object pointer and a class identifier table associating the class identifier with a virtual method table, the one or more loads can be eliminated in handling virtual method calls. The virtual call directly causes only a class identifier table entry (including a virtual method table) associated with the CID bits of an object pointer needs to be loaded.

In some embodiments, "inline caches" may be used to handle virtual method calls. Using inline caches includes predicting a likely class of the object associated with a virtual call and statically jumping to a predetermined address of a code section if the class prediction is correct. The predicted class and the predetermined address may be a class and an address associated with a previous virtual call at the same virtual call site. Determining if the last prediction is correct may include comparing the class of the object associated with the virtual call with the predicted class. In some embodiments, the process of FIG. 5 is included in class comparison. The class comparison may be performed using a class identifier stored in the header of an object pointer. For example, CID bits may be extracted from an object pointer associated with a virtual call and used to compare with a class identifier value associated with the predicted class. If the values match, execution jumps to the predetermined address of a code section and if the values do not match, a virtual method table is used to indirectly jump to the correct section of code.

Figure 7:
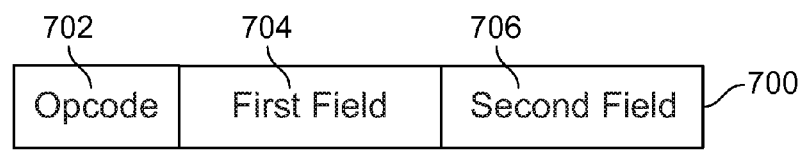
FIG. 7 is a diagram illustrating an embodiment of a computer processor instruction.

FIG. 7 is a diagram illustrating an embodiment of a computer processor instruction. Instruction 700 includes opcode 702, first field 704, and second field 706. First field 704 is associated with an object pointer. The object pointer, in some embodiments, is object pointer 202 of FIG. 2. Second field 706 is associated with a comparison class. The comparison class, in some embodiments, is associated with a value to be compared with CID 206 of FIG. 2. In some embodiments, field 704 and/or field 706 include an instruction operand. Fields 704 and 706 include one or more bits that represent a value or an identifier associated with a value used in an operation of the instruction. For example, field 704 and/or field 706 include one or more of the following: bit(s) that represent a value (e.g., immediate value) to be directly used in an operation of the instruction, memory address associated with a value to be used in an operation, and an identifier of a register containing a value to be used in an operation. The value may include a location identifier of an object. The example shown includes two fields, yet in other embodiments, instruction 700 may include one or more than two fields. In some embodiments, at least one field of instruction 700 is used to specify a configuration associated with the instruction. Examples of configurations include instruction format specification, format of an instruction field, and configuration associated with an operation of the instruction. In some embodiments, a processor uses opcode 702 to determine one or more operations associated with the instruction. In some embodiments, the one or more operations include comparing the class of the object pointer associated with the first field with the comparison class associated with the second field. For example, if a class identifier included in the object pointer does not match an expected class (comparison class), a trap is performed. In some embodiments, instruction 700 is associated with the process of FIG. 5. For example, the object pointer of FIG. 5 is associated with first field 704 and the comparison identifier in 505 of FIG. 5 is associated with second field 706.

In various embodiments, instruction 700 is associated with an object method (program function) invocation, and processing associated with the instruction includes performing one or more operations to prepare, handle, and/or execute the invocation. For example, data associated with a stack frame is modified. In some embodiments, instruction 700 is associated with the process of FIG. 6. The object pointer of FIG. 6 is associated with first field 704. For example, instruction 700 is at least in part used to handle a virtual method call. A pointer to an object associated with the virtual call is associated with first field 704, and a likely class (predicted class) of the object associated with the virtual call is associated with second field 706. CID bits are extracted from the object pointer associated with first field 704 and used in a comparison with the class identifier associated with second field 706. In various embodiments, if the values match in the comparison, execution jumps to the predetermined address of a code section; and if the values do not match, a virtual method table is used to indirectly jump to the correct section of code.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for handling a virtual method call, comprising:
    extracting, from a pointer to an object, a class identifier used to identify a class of the object, the pointer to the object being associated with the virtual method call, and the class identifier being embedded within the pointer;
    obtaining a virtual method table at least in part by using the class identifier extracted from the pointer to the object, wherein obtaining the virtual method table does not require loading the object, wherein the obtaining includes locating a first entry in a class identifier table mapping a plurality of class identifiers to a corresponding plurality of class data, the first entry being associated with the class identifier and comprising the virtual method table or a pointer used to obtain the virtual method table, and wherein the pointer includes an object information pointer that is used to obtain the virtual method table;
    locating a second entry in the virtual method table, the second entry being associated with the virtual method call, and wherein locating the second entry includes searching the virtual method table to find an address associated with a code section of the virtual method call; and
    jumping to an address associated with the second entry to execute code at the address, wherein the jumping includes loading the address value into a register and performing a register jump operation.

2. A method as recited in claim 1, wherein using the identifier to obtain a virtual method table includes comparing the identifier to a comparison value that is a predicted object class identifier for the object, and in an event that the identifier does not match the comparison value, locating the first entry in the class identifier table associated with the identifier.

3. A method as recited in claim 2, wherein the comparison value is dynamically determined.

4. A method as recited in claim 3, wherein reaching the determination includes performing a trap when the extracted identifier does not match the comparison value.

5. A method as recited in claim 2, wherein the comparison value is associated with a previous virtual call.

6. A method as recited in claim 1, further comprising modifying data associated with a stack frame.

7. A method as recited in claim 1, wherein the object is not loaded.

8. A method as recited in claim 1, wherein the identifier has fewer bits than a number of bits used to represent a class structure associated with the object.

9. A method as recited in claim 1, wherein the identifier has fewer bits than a total number of bits not implemented as address bits in the pointer to the object.

10. A system for handling a virtual method call, comprising:
   a processor configured to:
      extract, from a pointer to an object, a class identifier used to identify a class of the object, the pointer to the object being associated with the virtual method call, and the class identifier being embedded within the pointer;
      obtain a virtual method table at least in part by using the class identifier extracted from the pointer to the object, wherein obtaining the virtual method table does not require loading the object, wherein the obtaining includes locating a first entry in a class identifier table mapping a plurality of class identifiers to a corresponding plurality of class data, the first entry being associated with the class identifier and comprising the virtual method table or a pointer used to obtain the virtual method table, and wherein the pointer includes an object information pointer that is used to obtain the virtual method table;
      locate a second entry in the virtual method table, the second entry being associated with the virtual method call, and wherein locating the second entry includes searching the virtual method table to find an address associated with a code section of the virtual method call; and
      jump to an address associated with the second entry to execute code at the address, wherein the jumping includes loading the address value into a register and performing a register jump operation; and
   a memory coupled to the processor, to provide the processor with instructions.

11. A system as recited in claim 10, wherein using the identifier to obtain a virtual method table includes comparing the identifier to a comparison value that is a predicted object class identifier for the object, and in an event that the identifier does not match the comparison value, locating the first entry in the class identifier table associated with the identifier.

12. A system as recited in claim 11, wherein the comparison value is dynamically determined.

13. A system as recited in claim 12, wherein reaching the determination includes performing a trap when the extracted identifier does not match the comparison value.

14. A system as recited in claim 11, wherein the comparison value is associated with a previous virtual call.

15. A system as recited in claim 10, wherein the processor is further to modify data associated with a stack frame.

16. A system as recited in claim 10, wherein the identifier has fewer bits than a number of bits used to represent a class structure associated with the object.

17. A system as recited in claim 10, wherein the identifier has fewer bits than a total number of bits not implemented as address bits in the pointer to the object.

* * * * *